United States Patent

[11] 3,624,500

[72] Inventor Rupert Patzelt
Vienna, Austria
[21] Appl. No. 746,518
[22] Filed July 22, 1968
[45] Patented Nov. 30, 1971
[73] Assignee Osterreichische Studiengesellschaft Fur Atomenergie Ges m.b.H.
Vienna, Austria
[32] Priorities July 26, 1967
[33] Austria
[31] A 6962/67;
July 22, 1967, Germany, No. P 16 05 960.2; Apr. 2, 1968, Germany, No. P 17 55 128.9

[54] METHOD AND AN ARRANGEMENT FOR DETERMINING PULSE AMPLITUDES
16 Claims, 5 Drawing Figs.

[52] U.S. Cl. .......... 324/99 D, 324/111, 340/347 AD
[51] Int. Cl. .......... G01r 17/06, G01r 1/00, H03k 13/02
[50] Field of Search .......... 324/99, 99 D, 111, 120; 340/347 AD

[56] References Cited
UNITED STATES PATENTS

| | | | |
|---|---|---|---|
| 3,201,781 | 8/1965 | Holland | 324/120 X |
| 3,368,149 | 2/1968 | Wasserman | 324/99 |
| 3,378,786 | 4/1968 | Andrea | 340/347 X |
| 3,480,948 | 11/1969 | Lord | 340/347 |
| 3,296,613 | 1/1967 | Andersen et al. | 324/120 X |

*Primary Examiner*—Rudolf V. Rolinec
*Assistant Examiner*—Ernest F. Karlsen
*Attorney*—McGlew and Toren

ABSTRACT: An analog-digital converter includes a storage capacitor, an oscillator, and a counter, such as a binary counter, a decade counter, or the like. Each input pulse charges the storage capacitor. The storage capacitor is initially rapidly discharged until it approaches the zero charge point, and thereafter is discharged slowly. During the rapid or quick discharge, oscillator pulses delivered to the counter have a higher value than during the slow discharge. Thereby, after complete discharge of the capacitor, the number stored in the counter corresponds to the amplitude of the input signal. The required stability and linearity of the conversion is ensured by continuous calibration of the converter by a pulse generator.

INVENTOR:
RUPERT PETZELT
By: McGlew and Toren
Attorneys

INVENTOR:
RUPERT PETZELT
By: McGlew and Toren
Attorneys

INVENTOR: RUPERT PETZELT
By: McGlew and Toren
Attorneys

METHOD AND AN ARRANGEMENT FOR DETERMINING PULSE AMPLITUDES

In measuring ionizing particles with semiconductor detectors the transformation of particle energy to electrical signals is effected with a very good solution. The relative half width of lines of monoenergetic radiation (for instance photolines of gamma radiation) in the amplitude spectrum is, in advantageous cases, $10^{-3}$ or less. If, in a measurement, a large energy range is to be comprised and if the resolution ability of the detectors is to be completely utilized about five to 10 channels have to correspond to one spectrum line, i.e. up to 10,000 channels correspond to the whole amplitude range. From these facts arise demands on the analog-digital converter: The systems used at the present time comply with these demands only very poorly, and with a very long conversion (dead time).

The conversion of the amplitude in the channel address should be stable for more than one channel with typical operation conditions; also deviation from the ("integral") linearity should be below this limit. The stability of the channel width and its dependence on the amplitude (differential linearity) should be better than 1 to 2 percent. The duration of the conversion should be as small as possible, and in any case below 50 microseconds.

According to the invention, it is proposed, with a method for measuring pulse amplitudes, that each pulse is brought to a storage capacitor and charges the same, that the storage capacitor is discharged quickly at first, up to the proximity, of zero charge, then slowly, and that, during the quick discharge, pulses of an oscillator are brought to a counter with a higher value than during the slow discharge whereby after the complete discharge of the capacitor, the number storaged in the counter corresponds to the amplitude of the primary signal.

Thus, the conversion time can be considerably shortened with a high accuracy. The pulses of the oscillator are here inserted into the counter with a value corresponding to the gradient of the discharge. The required stability and linearity of the conversion by means of a pulse generator. For this purpose, about every $10^{-1}$ to $10^{-2}$ sec., pulses having a suitable amplitude for the checking of the conversion factor and the zero mark, have to be brought to the converter. Both magnitudes have to be adjusted by the method usual with the so-called spectrum stabilization.

The object of the invention is described by way of example with respect to the drawings.

Figure 1:
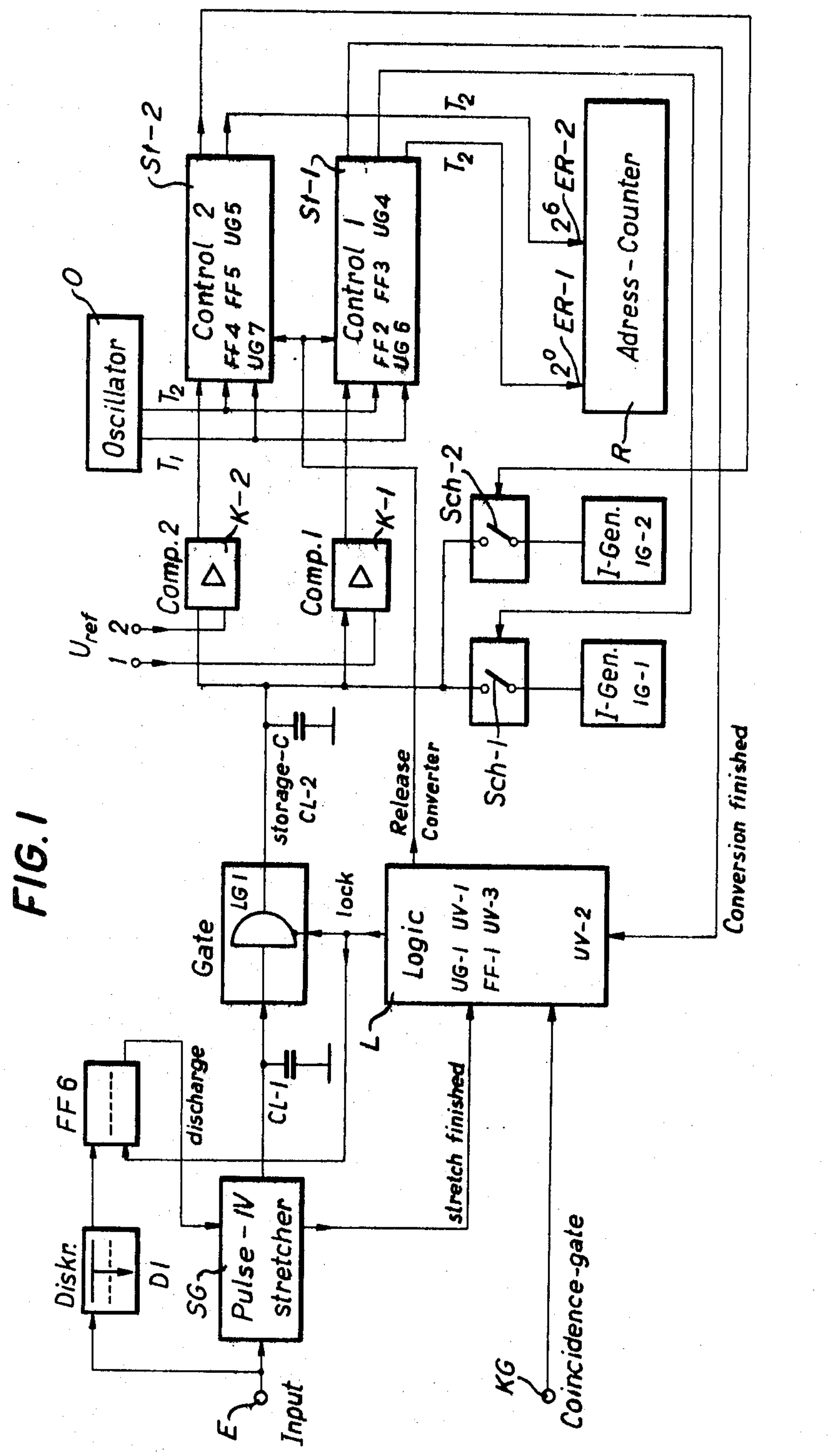

FIG. 1 is a block diagram of the converter.

Figures 2A, 2B, 2C:
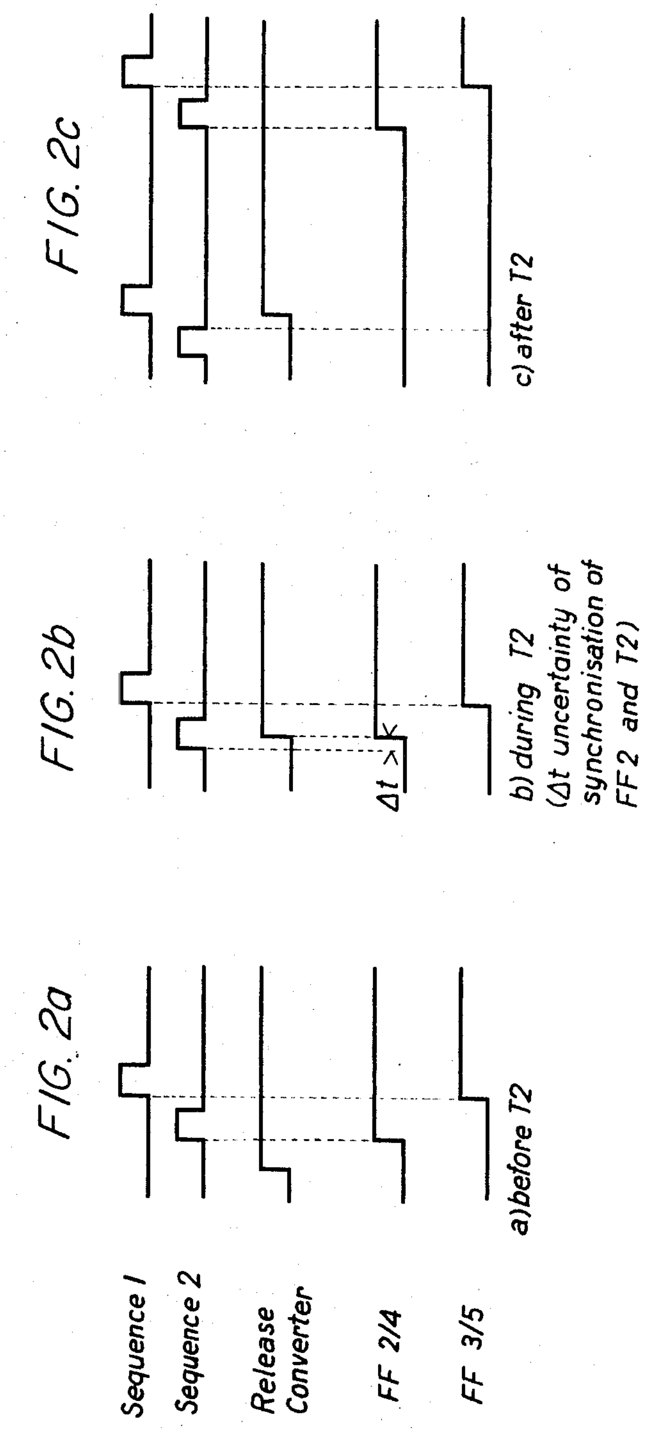
Figure 3:
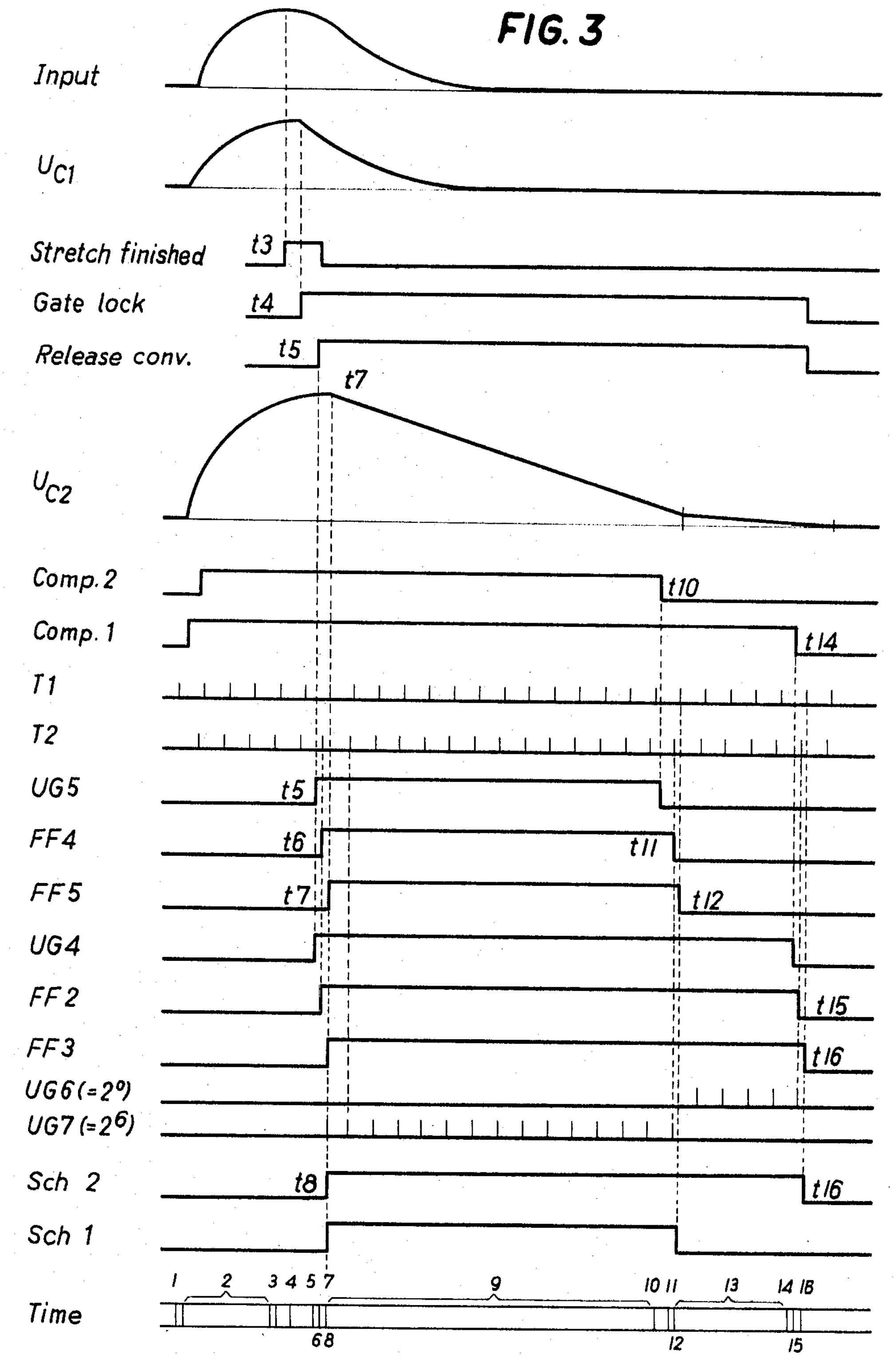

FIGS. 2*a* and 2*c* illustrate the synchronization of the switching process and FIG. 3 is a pulse plan as to time.

Refer first to FIG. 1 and 3. After the incoming pulse has started, a discriminator D–1 is switched on and actuates the flip-flop FF–6. By this actuation, the discharge circuit of a pulse stretcher, or peak voltage detector, SG blocked. The capacitor CL–1 in the pulse stretcher and, by means of a linear gate LG–1, also the storage capacitor CL–2 in the converter, are charged. After the ending of the incoming pulse the condensers are charged. By this charging, a comparator K–1 and, if the amplitude of the incoming pulse has been large enough, also a comparator K–2 have been excited. The pulse stretcher SG informs the logic circuitry L that the pulse stretching a extension is finished, whereby a switch gate UG–1 is operated in the logic circuitry. The logic circuitry blocks the gate LG–1 and disconnects the storage capacitor CL–2 from the output of the pulse stretcher. At this time, the flip-flop FF–6 is reset, whereby the capacitor CL–1 can be discharged. Now the logic circuitry L enables the conversion. The comparator K–1 operates now the gate UG–4 and, in case of a sufficient pulse height, the comparator K–2 operates the gate UG–5. The flip-flops FF–2 and FF–4 are prepared. As will be explained later on, an oscillator pulse T–2 operates the flip-flops FF–2 and FF–4. Another oscillator pulse T–1 transfers the position of flip-flop FF–2 to FF–3 and of flip-flop FF–4 to FF–5. The flip-flops FF–3 and FF–5 open the current switches Sch–1 and Sch–2 of the current generators IG–1 and IG–2. After the flip-flop FF5 is set, the gate UG–7 is opened and the pulses T–2 is inserted at the position ER–2 for $2^6$ of the counter R. If only the flip-flop FF–3 is set, only, the gate UG–6 for the ER–1 for the ER for position $2^0$ is opened.

It is assumed that the converter has 8,192 channels. The two currents of the discharge generators IG–1 and IG–2 must have then a ratio of 63:1. As long as the discharge of the storage capacitor CL–2 is effected by both the currents at the same time, the pulses of the oscillator switch on the counter B for 64 channels. Thus, the discharge is effected very quickly. As soon as the storage capacitor CL–2 is discharged near to the steady value, the comparator switches back as its trigger threshold is passed. Now the flip-flop FF–4 at the reset input is prepared and is reset by the next pulse T–2. The next pulse T–1 resets the flip-flop FF–4, blocks the gate UG–7 and opens the gate UG–6. By this means, the switch Sch–2 switches off the discharge generator IG–2. The further discharge is effected by the current of the generator IG–1 alone, until the steady value of the storage capacitor is reached. The pulses T–2 change the counter for one channel at a time. Thus, the discharge is slow. After the steady value is ready, K–2 switches off, whereby the flip-flop FF–2 and FF–3 are reset, the gate UG–6 is blocked and the current from the generator IG–1 is switched off. At the same time the logic circuitry is informed that the conversion is finished. An univibrator UV–2 resets the flip-flop FF–1 in the logic circuitry whereby the blockade of the gate LG–1 is ended and the storage capacitor CL–2 is again connected to the input. The number stored in the counter R, corresponds exactly to the amplitude of the incoming signal.

It is also possible to provide the inventive arrangement with a coincidence control. The linear gate LG–1 is blocked in the static state. As soon as a signal reaches the coincidence input KG, the gate LG–1 becomes charged and the flip-flop FF–1 can be operated by means of the gate UG–1 and the univibrator UV–1. As possibly no conversion takes place, the flip-flop FF–6 has to be reset after some time by means of a delay univibrator UV–3.

The accuracy and the stability of the conversion depends mainly on the current generator IG–2 and on the uniformity of the time correlation of switching on and off this current generator with the pulses of the oscillator. The synchronized switching off has to be released by a comparator K–2 having a threshold approximately 64 channels above the steady value so that even with an unfavorable time relation of the release signal to the next oscillator pulse after the switching at least one channel has to be passed by the slow discharge. As long as this condition is fulfilled, the position of the switch threshold does not influence the result of measurement directly.

The exact synchronization of the switch with the oscillator is achieved if the output of the switch comparator K–2 sets a flip-flop FF–4 by way of gate UG–5 being blocked during the oscillator pulse. By this fact, only, it can be ensured that the specific switch gate sets the release signal at first and that the switching itself is caused by the front flank of the oscillator pulse. The uncertainty of the time correlation between oscillator pulse and switching has to correspond to the choosen ratio of the two generator currents, and has to be, for the explained example, less than one sixty-fourth of the oscillator period.

If the amplitude of the incoming signal is below the switch threshold, the quick discharge is not to be used, of course.

From FIG. 2 the synchronization of the switch can be learned:

a) shows the release of the pulse T–2, b) during the pulse T–2 and c) after the pulse T–2.

The correct time relations are achieved in the present embodiment by two time pulse sequences which are displaced as to time. The time period starts with the pulse T–1. By this signal the two flip-flops FF–3 and FF–5 are operated, which control the two current generators IG–1 and IG–2 and the two input gates of the counter. Shortly before the end of the time period the pulse T–2, arrives, being guided to the counter and inquiring at the same time the switching conditions of the flip-flops FF–3 and FF–5 ("release", comparators K–1 and K–2). As each time pulse has a finite duration and the inquired condition can be altered during this time, too, the flip-flops FF–2 and FF–4 are used to take up these conditions, which are not yet exactly synchronized, from the comparators. (The possible error is about equal to the duration of the time pulse). The pulse T–1 has to come after the end of the pulse T–2 at least for the switching time of the flip-flops FF–2 or FF–4; then a synchronization "completely" exact synchronization is ensured—of course, apart from variations of the switching times which, however, are sufficiently small with quick, logic circuits. The function of each pair of RS flip-flops FF–2 and FF–3, and FF–4 and FF–5 resp. An RS flip-flop is a bistable multivibrator having separate inputs for setting and resetting —corresponds to that of a so-called master-slave flip-flop, where the information is received at the input at the beginning of the time pulse and is to the output at the end of the time pulse.

The linear gate LG–1 at the input corresponds to a sampling gate and serves, in unusual operation, for disconnecting the storage capacitor CL–2 from the input during the conversion so that the linear discharge is not disturbed. In conjunction with the coincidence—or anticoincidence gate control, it serves also for controlling the input of the converter. Thus, a pulse stretcher S6 is arranged in front of the proper converter.

This stretcher or peak voltage detector, has to signal the end of the charging of its storage capacitor CL–1 with a "finished" signal while the converter returns the information of the blockage of the input gate LG–1 and releases therewith the discharge of the first storage capacitor CL–2. During the specific conversion, a following pulse at the input E can principally be stored in analog form in the pulse stretcher if the discharge by leakage currents can be kept sufficiently low during the holding time.

The necessary extreme stability of the current generators can be gained by the use of field effect transistors. The magnitude of the current is thereby defined by the stabilization of the voltage drop at a resistor. Since the input of the variable gain amplifier contains a field effect transistor, the current loss at the input of this amplifier is sufficiently small. As a control member a field effect transistor is also used, wherein the current at drain and source is almost completely equal, as on the control electrode (gate) just a very small leakage current is flowing ($1nA=10^{-9}A$). At least even as a switch, a different step having two field effect transistors is used where again no current is lost. Since in a field effect transistor no storage charge effect occurs a precise switching on and off of the current results, practically without over swing.

By the utilization of an adjusted pair of field effect transistors, a Zener diode compensated as to temperature and first-rate metal layer resistors, the required stability can be reached.

The extreme requirements as to stability and precision of the converter can be fulfilled easier if standard pulses are brought to the input of the converter at periodic intervals. A control circuit has to adjust continuously the parameters of the converter in a way such that incoming amplitudes correspond just to the transition between two adjusted channels. Since with the parallel special construction of the converter, the synchronization of the discharge current generators with the oscillators, the usual principal uncertainty of the conversion corresponding to one oscillator period, is not present, a special quick adjustment can be used.

An amplitude modulation of about one-tenth channel width is impressed on the standard or calibration pulses that each second pulse is smaller by this amount than the other. In normal condition, each second pulse is converted into the channel "*n*–" and each other pulse is converted into channel "*n*". By an RS flip-flop and gates, it is ensured that, in this condition, no control pulses are brought to the adjustment means. However, if this alternation is disturbed by a displacement of the conversion, the output pulses increase or decrease the content of an electronic storage in the right sense. The same influences by way of a digital-analog converter, the discharge current of the current generator IG–2 and restores the conversion to the right value.

The adjustment is integral, i.e. it removes a drift completely. At the same time most of the small adjustment swingings about the real value are avoided as on account of the modulation of the standard signals and the explained gate arrangement no signals are brought to the adjustment storage in normal condition. Since, on the other hand, no statistical variations occur in the conversion, it is not necessary to provide for an additional filter device. The frequency of repetition of the checking pulses is chosen advantageously to be about 80 or 40 cycles to avoid slow beats against the frequency of the net.

By a simultaneously but independently working circuit, the zero point can be stabilized in the same way and, if necessary, also the increase of the slow discharge (current generator IG–1).

The amplitude for the stabilizing of the quick discharge is advantageously chosen at the upper end of the range at a channel number which is reached by as few pulses as possible during the slow discharge. For the stabilization of the zero point an amplitude at the lower end of the complete range is used. The adjustment has thereby an effect on the reference voltage of the comparator K–1. Accordingly the stabilization of the slow discharge is effected near the lower end of the range with an amplitude which lies just below the end one for switching on the quick discharge.

By a suitable circuit, it can easily be prevented that the converted standard pulses are brought to the storage device. Superpositions with measurements pulses can be identified easily and the consideration in the adjustment circuit can be avoided. These effects can be prevented if two gates switch the input to the measurement pulses and adjustment pulse respectively. This will be advantageous with high measurement pulse rates. However, as in this case both pulses run through different gates, changes of the transformation characteristics of these gates can effect instabilities.

The stability of the adjustment depends, of course, completely on the stability of the standard pulse generator. Examinations have shown that the known passive pulse generators with mercury-wetted relays and a mere passive pulse formation forms pulses having an amplitude which constantly is better than $10^{-4}$.

The described adjustment stabilizes the converter in itself and cannot replace completely a stabilization of the spectrum comprising also the amplifier and detector. However, since no static variations (background) are superposed thereto it can work quicker and more exactly.

What we claim is:

1. A method for measuring separately the amplitudes of individual pulses comprising supplying each pulse to be measured separately to a storage capacitor to charge the latter to the peak value of the pulse; supplying counting pulses, at a constant frequency, from an oscillator to a counter register through different inputs which advance the register in steps of different values, with the steps of different values corresponding to respective rates of discharge of the capacitor; at the termination of each individual pulse, switching on at least two capacitor discharging current generators, at least one of which is switched on synchronized with the counting pulses from the oscillator; then discharging the capacitor continuously and rapidly at first, until the charge decreases below a predetermined level; when the charge of the capacitor reaches the predetermined level switching off at least one of the current generators synchronized with an oscillator pulse; and then discharging the capacitor continuously and slowly until the capacitor is discharged and displaying the value on the counter substituted therefor.

2. A method according to claim 1 characterized in that for ensuring the standard calibrating pulses are inserted into the converter at periodic intervals.

3. A method according to claim 2 characterized in that the calibrating impulses have an amplitude modulation of about one-tenth channel width whereby each second pulse is smaller by that amount than the adjacent pulses.

4. A method, as claimed in claim 3, including the step of, responsive to the calibrating pulses being not stored in the correct alternating sequence into two chosen adjacent address channels of the counter, effecting an adjustment.

5. A method, as claimed in claim 1, including the steps of effecting exact synchronization of the switching of the discharge generators with an oscillator pulse by supplying, from the oscillator, two constant frequency pulse sequences displaced as to time; utilizing the first pulse sequence in a first synchronization operation to obtain approximate synchronization; and utilizing the second pulse sequence in a second synchronization operation to obtain exact synchronization.

6. A method, as claimed in claim 5, including utilizing the first pulse sequence, after initiation of the pulse conversion, to operate two flip-flops; utilizing the second pulse sequence to transfer the position of the two flip-flops to two additional flip-flops; utilizing the two additional flip-flops to switch on the discharge generators and to open a gate; and utilizing the then opened gate to apply the second pulse sequence to the counter for advancing the counter in steps of a predetermined value.

7. A method, as claimed in claim 6, in which a discharge generator is switched off after passing a threshold, the opened gate is closed and another gate is opened; whereby the pulses of the second sequence are applied to the counter by the other opened gate, advancing the counter in steps of a value different from said determined value.

8. Apparatus for measuring the amplitudes of individual pulses comprising, in combination, an input for pulses to be measured; a storage capacitor connected to said input for separate charging by each pulse to be measured; at least two discharge generators connected to said storage capacitor for continuous discharge of the latter, a first comparator and control means responsive to the charge on said storage capacitor for disconnecting one discharge generator from said storage capacitor when the charge on said storage capacitor reaches a predetermined level; an oscillator having a constant frequency pulse output; a counter; a gate means controlling delivery of oscillator pulses to the counter through different inputs which advance the counter in steps of different values; said gate means controlling delivery being responsive to the arrival of a pulse to be measured for starting delivery of oscillator pulses to the counter; said gate means controlling delivery being responsive to a control signal from the first comparator and control means to change the counter inputs to which the delivery of oscillator pulses to the counter are applied at the same time one of the discharge generators is disconnected from the storage capacitor; a second comparator and control means for controlling said gate means controlling delivery to terminate delivery of oscillator pulses to the counter when the charge on the storage capacitor reaches zero; and readout means for the counter to display a measured value of the pulse amplitude.

9. Apparatus for measuring pulse amplitudes, as claimed in claim 8, one of said first and second comparator and control means being activated only when the pulse amplitude exceeds a predetermined value to activate the associated discharge generator in response to the pulse amplitude exceeding such predetermined value.

10. Apparatus for measuring pulse amplitudes, as claimed in claim 8, in which each control means of each of said first and second comparator and control means has two inputs for two oscillator pulse sequences displaced relative to each other with respect to time; each control means having a first output connected to the associated discharge generator and a second output connected to said counter; the two second outputs being connected to respective different inputs of said counter.

11. Apparatus for measuring pulse amplitudes, as claimed in claim 8, including a synchronization circuit which switches the associated discharge generator on and off in synchronization with the oscillator pulses.

12. Apparatus for measuring pulse amplitudes, as claimed in claim 11, including a peak voltage detector connecting the pulse input with said storage capacitor for pulse prolongation; said discharge generators providing constant current and being connectable individually to said storage capacitor and to a respective control containing said gate means; each control being connected between an output of said oscillator and a respective input of said counter, each control including at least one synchronization circuit providing a fixed correlation in time between the switching on and off of said generators and the oscillator pulses.

13. Apparatus for measuring pulse amplitudes, as claimed in claim 12, in which each control has an input connected though a respective one of said comparators with said storage capacitor for the termination of the individual phase of the discharge; and a program logic connected to said comparators to initiate the discharge process.

14. Apparatus for measuring pulse amplitudes, as claimed in claim 13, in which each control includes two series-conected synchronization circuits each comprising bistable multivibrator circuits having setting and resetting inputs connected to said oscillator; said synchronization circuits each having a beat control input connected to the output of said oscillation and releasing the switching.

15. Apparatus for measuring pulse amplitudes, as claimed in claim 14, in which the response threshold of one envelope comparator is adjusted to a value which lies between the range of the pulse amplitudes to be measured and the response threshold of the other voltage comparator; means connecting the output of said one voltage comparator, in accordance with its polarity, with the input of the synchronization circuit in one control; said one control being connected at the start of discharge and being disconnected as soon as the voltage of the storage capacitor, during discharge thereof, is reduced to the response threshold of said one voltage comparator; the synchronization circuits of said control being so connected that the oscillator pulses are supplied, in accordance with which control is then connected, either to a first input of said counter or to a second input of said counter; and means operable, upon disconnection of both controls, to disconnect said current discharge generators from said storage capacitor.

16. Apparatus for measuring pulse amplitudes, as claimed in claim 12, including a charging capacitor connected to said peak voltage detector to improve the pulse extension, and a disconnectable charging circuit connected to said peak voltage detector and to said storage capacitor.

* * * * *

UNITED STATES PATENT OFFICE

CERTIFICATE OF CORRECTION

Patent No. 3,624,500 Dated November 30, 1971

Inventor(s) Rupert Patzelt

It is certified that error appears in the above-identified patent and that said Letters Patent are hereby corrected as shown below:

In the heading to the printed specification, cancel lines 12-14.

Signed and sealed this 21st day of November 1972.

(SEAL)
Attest:

EDWARD M.FLETCHER,JR.
Attesting Officer

ROBERT GOTTSCHALK
Commissioner of Patents